Feb. 24, 1959 — A. J. PETZINGER — 2,875,406
WATTHOUR METER PHASE ADJUSTER
Filed Oct. 30, 1953 — 2 Sheets-Sheet 1
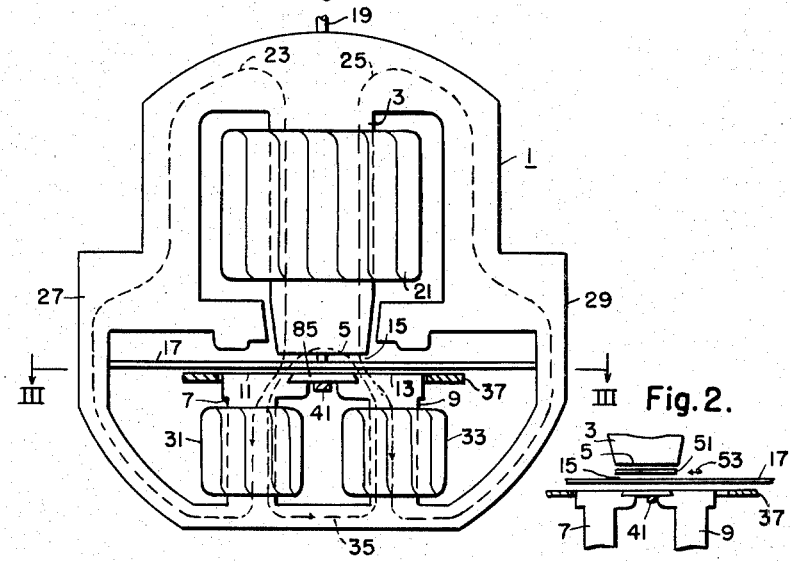
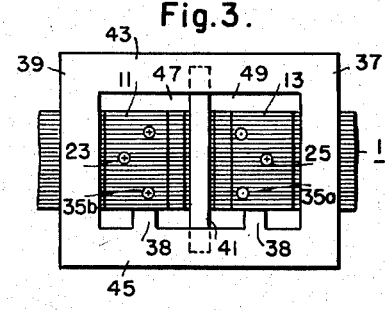
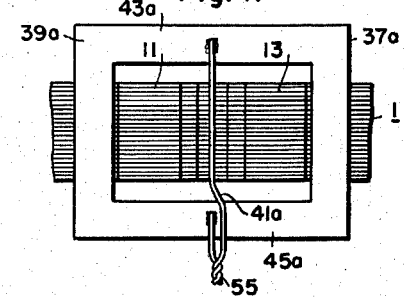
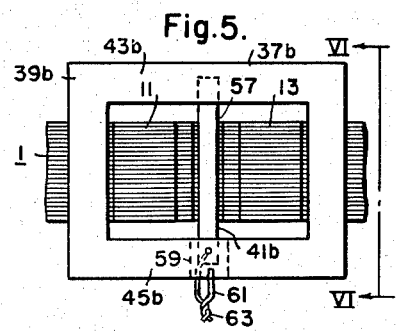
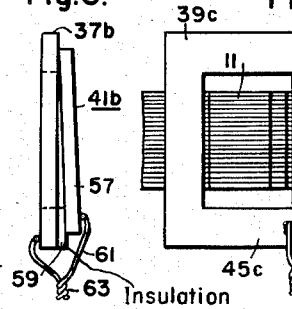
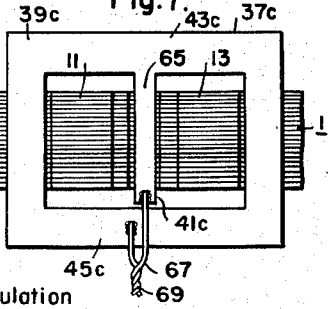
WITNESSES:
E. A. McCloskey
David M. Schiller
INVENTOR
Ambrose J. Petzinger.
BY C. L. Freedman
ATTORNEY

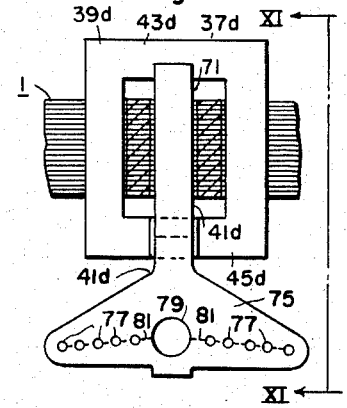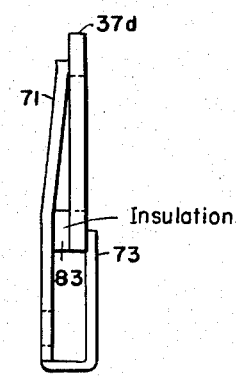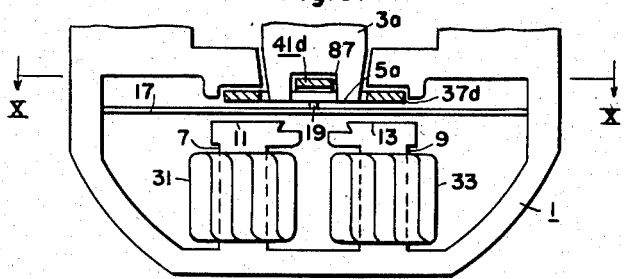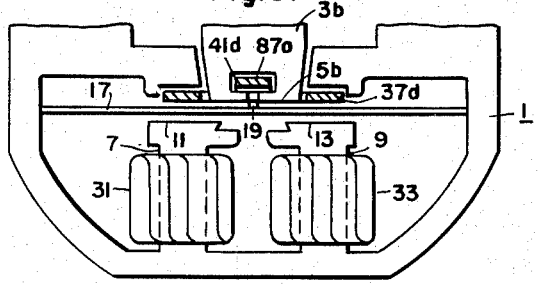

United States Patent Office 2,875,406
Patented Feb. 24, 1959

2,875,406

WATTHOUR METER PHASE ADJUSTER

Ambrose J. Petzinger, Fair Lawn, N. J., assignor to Westinghouse Electric Corporation, East Pittsburgh, Pa., a corporation of Pennsylvania Application October 30, 1953, Serial No. 389,191

16 Claims. (Cl. 324—138)

This invention relates to a device for establishing a predetermined displacement between the magnetic flux components of a shifting magnetic field and it has particular relation to a lagging or quadrature adjusting member for establishing the correct displacement between the voltage and current magnetic fluxes of an alternating current watthour meter.

In accordance with the invention, a lagging member is provided for establishing a desired phase displacement between the magnetic flux components of a shifting magnetic field. When the lagging member is employed for establishing the correct phase displacement between the current and voltage magnetic fluxes of an alternating current watthour meter, the lagging member conveniently may be disposed to lag both the voltage and current magnetic fluxes. Such a lagging member is shown and described in Patent No. 2,512,345 issued to R. M. Leippe. The lagging member preferably incorporates means providing compensation for errors in registration caused by variations in temperature.

In a preferred embodiment of the invention, the lagging member comprises an electroconductive plate disposed in the form of a hollow rectangle to provide a rim for lagging voltage magnetic flux of a watthour meter. An electroconductive bar extends across the rim to connect opposing sides thereof for the purpose of lagging current magnetic flux of the watthour meter. The bar is preferably disposed symmetrically of the rim to provide a pair of openings establishing a figure-of-eight configuration. If desired, the electroconductive bar may be located asymmetrically of the rim.

In order to provide compensation for temperature errors, the rim is constructed of a material having a low temperature coefficient of resistance, and the connecting bar is formed of a material having a relatively high temperature coefficient of resistance. By proper positioning of the lagging member relative to the magnetic structure of the meter, additional desirable performance characteristics of the meter may be provided.

In the past, it has been the practice to provide watthour meters having magnetic shunts associated therewith for the purpose of controlling the load response of the meter. In accordance with a further aspect of the invention, a portion of the lagging member may be constructed of a magnetic material for the purpose of shunting current magnetic flux away from the associated armature to control the load response of the meter.

In addition, the connecting bar may be provided with an adjustable resistance for the purpose of adjusting the lagging effect thereof.

It is, therefore, an object of the invention to provide an improved device for adjusting the phase displacement between the magnetic flux components of a shifting magnetic field.

It is another object of the invention to provide a flux lagging member in the form of a hollow rectangle having an electroconductive bar extending thereacross.

It is a further object of the invention to provide a flux lagging member for an alternating current watthour meter having separate portions for lagging both the voltage and current magnetic flux to obtain the proper phase displacement between such magnetic fluxes.

It is still another object of the invention to provide a flux lagging member as defined in the preceding paragraph wherein the portions are constructed of material having different temperature coefficients of resistance to provide compensation for temperature errors of the meter.

It is a still further object of the invention to provide a flux lagging member as defined in the preceding paragraph wherein one of the portions is constructed of magnetic material for controlling the load response of the meter.

It is another object of the invention to provide a flux lagging member as defined in the preceding paragraph wherein the portion for lagging the current magnetic flux is provided with an adjustable resistance to vary the lagging effect thereof.

Other objects of the invention will be apparent from the following detailed description taken in conjunction with the accompanying drawings, in which:

Figure 1 is a view in rear elevation of a watthour meter employing the invention;

Fig. 2 is a view with parts shown schematically of a portion of the meter of Fig. 1;

Fig. 3 is a view in section taken along the line III—III of Fig. 1 with parts broken away;

Figs. 4 and 5 are views similar to Fig. 3 showing different constructions for a part thereof;

Fig. 6 is a view in side elevation taken along the line VI—VI of Fig. 5 with parts removed;

Fig. 7 is a view similar to Fig. 3 showing a different construction for a part thereof;

Figs. 8 and 9 are views similar to Fig. 1 with parts broken away showing different constructions for parts thereof;

Fig. 10 is a view taken along the line X—X of Fig. 9, and

Fig. 11 is a view in side elevation taken along the line XI—XI of Fig. 10.

Referring to the drawings, Fig. 1 shows an alternating current watthour meter having a magnetic structure 1 including a voltage magnetic pole 3 having a pole face 5 and a pair of current magnetic poles 7 and 9 having pole faces 11 and 13. The pole faces 11 and 13 are disposed in a common plane which is spaced from the plane of the pole face 5 to define an air gap 15 in which an electroconductive armature in the form of a disc 17 is disposed. Conveniently, the disc 17 may be mounted on a shaft 19 for rotation relative to the magnetic structure 1.

In order to direct magnetic flux through the air gap 15, the voltage magnetic pole 3 is surrounded by a voltage winding 21. When the winding 21 is energized from a source of alternating voltage, an alternating magnetic flux is established which traverses the air gap 15 and the disc 17 positioned therein. Such magnetic flux is represented in Fig. 1 by dotted lines 23 and 25 which have arrows associated therewith for the purpose of indicating an instantaneous direction of flux flow. It will be observed that voltage magnetic flux represented by the dotted line 23 passes through the magnetic pole 3 and traverses the air gap 15 and the disc 17 to enter the magnetic pole 7. The magnetic flux then returns to the magnetic pole 3 through the left hand arm 27 of the magnetic structure 1 as viewed in Fig. 1. In a similar manner, the magnetic flux represented by the dotted line 25 traverses the air gap 15 and the disc 17 to enter the current magnetic pole 9. This flux returns to the voltage magnetic pole 3 through a right hand arm 29 of the magnetic structure 1.

Current windings 31 and 33 are disposed respectively about the current magnetic poles 7 and 9. These windings are connected in series and are oppositely poled so that when winding 31 directs a magnetomotive force downwardly in the current pole 7, the winding 33 establishes an equal upwardly directed magnetomotive force in the current pole 9. The resulting flow of flux is represented in part by a dotted line 35 which has an instantaneous direction of flow represented by an arrow associated therewith. As shown in Fig. 1, the flux represented by dotted line 35 enters the air gap 15 from the current pole 9, traverses the disc 17 and may possibly enter the voltage pole 3. The flux then bends downwardly to cross the disc 17 again and to enter the current pole 7. From the current pole 7, the flux returns to the current pole 9 through an appropriate part of the magnetic structure 1.

Additional current magnetic flux may flow in paths similar to those represented by dotted lines 23 and 25. For the assumed instantaneous conditions, current magnetic flux represented by the dotted line 25 would flow in a direction opposite to that represented by the arrow on line 25.

When the voltage winding 21 and the current windings 31 and 33 are energized, it is desirable that the magnetic fluxes therefrom which traverse the air gap 15 have a predetermined phase relationship. For a watthour meter, this phase relationship should be such that at unity power factor the two magnetic fluxes are in quadrature. Although the voltage winding 21 may have substantial inductance for the purpose of lagging the voltage flux produced thereby substantially behind the voltage applied to the winding 21, such lagging does not suffice to establish the desired phase relationship between the voltage and current magnetic fluxes.

In accordance with the invention, a lagging or quadrature member is disposed adjacent to the air gap 15 for the purpose of lagging one or both of the magnetic fluxes. This member may be located at any position either adjacent the current magnetic pole pieces or the voltage magnetic pole piece wherein it intercepts or surrounds the desired magnetic flux. In the specific embodiment of Fig. 1, a lagging member 37 surrounds the current magnetic poles 7 and 9 adjacent the faces 11 and 13 thereof and may be secured relative to the poles 7 and 9 in any desired manner. For example, ears 38 may be struck down from the member 37 with the ears 38 being secured to the pole pieces 7 and 9 as by rivets.

The configuration of the lagging member 37 is clearly shown in Figs. 1 and 3. As there shown, the lagging member 37 is of substantially figure-of-eight configuration including an annular electroconductive rim 39 and an electroconductive bridge 41 connecting spaced points of the rim 39. The rim 39 may be of any desired configuration and is illustrated in Fig. 3 as being preferably of rectangular configuration. The bridge 41 connects opposing sides 43 and 45 of the rim 39 and is disposed symmetrically with respect to the rim 39. As will appear hereinafter, the bridge 41 may be disposed asymmetrically of the rim 39 to provide desired characteristics of the watthour meter. The bridge 41 may be secured to the rim 39 in any desired manner, such as by welding or soldering.

The operation of the lagging member 37 may be understood more clearly by tracing paths of the magnetic fluxes relative to the lagging member. By inspection of Fig. 3, it will be observed that the voltage magnetic fluxes represented by the dotted lines 23 and 25 both enter the paper in Fig. 3 in the same direction. Such voltage magnetic fluxes tend to induce an electromotive force in the rim 39 which directs current around the rim. Consequently, the rim 39 operates substantially as a conventional lag loop to lag the voltage magnetic flux.

The current magnetic flux also is shown in Fig. 3. It will be noted that such magnetic flux emerges from the paper towards the observer at a point 35a and re-enters the paper traveling away from the observer at a point 35b. With respect to the current magnetic flux, the member 37 may be considered to comprise two electroconductive loops with one loop having the opening 47 and the other loop having the opening 49, the bridge 41 being common to both loops. For the assumed conditions in Fig. 3, all current magnetic flux entering the opening 47 is directed into the paper and travels away from the observer, whereas current magnetic flux entering the opening 49 emerges from the paper toward the observer. The resulting electromotive forces produce current flow in the same direction through the bridge 41 with the resultant current dividing between the two halves of the rim 39 which connect the ends of the bar in parallel. Consequently, current magnetic flux also is lagged by the member 37.

Since current flowing in the bridge 41 is produced substantially only by current magnetic flux, the impedance characteristics of the bridge may differ from those of the rim for the purpose of providing additional desirable performance characteristics of the watthour meter. For example, let it be assumed that the rim 39 is constructed of a first material such as bronze and that the bridge 41 is constructed of copper or other material having a temperature coefficient of resistance substantially higher than that of the first material. By proper selection of the temperature coefficients of resistance, the lagging member 37 may be designed to provide temperature control as described in the Oman Patent 1,764,339.

For the purpose of adjusting the light load performance of the watthour meter, a light load adjuster 51 in the form of an electroconductive plate is positioned in the air gap 15 adjacent the voltage pole face 5 as shown in Fig. 2. As well understood in the art, the plate may be adjusted in directions indicated by the arrows 53 of Fig. 2 for the purpose of lagging a varying amount of voltage flux to provide a light load adjusting torque acting on the disc 17. By means of a lag plate, such as the lag plate 37, a portion of the voltage magnetic flux may be lagged to provide a torque acting on the disc 17 which is independent of the torque produced by the light load adjuster 51. For example, the lagging member 37 may be positioned as shown in Fig. 2 with the bridge 41 disposed asymmetrically of the voltage magnetic flux. With such arrangement, a voltage is induced in the bridge by the voltage magnetic flux which directs current through the bridge to produce a magnetic flux which is displaced in time phase from a portion of the voltage magnetic flux, thereby producing a torque acting on the disc 17. The lagging member 37 may be adjusted to provide different degrees of asymmetry between the bar 41 and the voltage magnetic flux for varying the torque applied to the disc 17. Such torque may be utilized to compensate for inherent errors in registration of the meter at light loads, thereby permitting the light load adjuster 51 to be employed for controlling the light load response of the meter. With this arrangement the light load adjuster 51 may be positioned symmetrically relative to the voltage pole 3 with equal ranges of adjustment in the directions represented by the arrows 53. If desired, the bridge 41 may be disposed asymmetrically relative to the rim 39 with the rim 39 being positioned symmetrically relative to the voltage magnetic flux.

In order to provide a lagging member having variable lagging effects, means may be provided for adjusting the electrical resistance of the bridge 41. Such adjustment may be provided in a number of ways. For example, with reference to Fig. 4, a lagging member 37a is shown which corresponds to the lagging member 37 of Figs. 1, 2 and 3 and which has a rim 39a and a bridge 41a corresponding to the rim 39 and bridge 41 of the member 37. The bridge 41a comprises a deformable strip or wire of suitable electroconductive material with the terminals of the strip engaging opposing sides 43a and 45a of the rim 39a. As illustrated, the strip or wire is wound upon itself intermediate the terminals thereof to provide a connection 55 which may be adjusted for the purpose of varying the effective length of the bridge.

With reference to Fig. 5, a lagging member 37b is provided which is similar to the lagging member 37. However, as there shown, the bridge 41b includes an electroconductive bar 57 having one terminal thereof engaging the side 43b of the rim 39b and having the other terminal thereof adjacent to but insulated from the opposing side 45b by means of insulation 59 as shown in Fig. 6. In order to provide a bridge 41b of adjustable resistance, a deformable wire or strip 61 of electroconductive material has a terminal engaging the bar 57 and another terminal engaging the side 45b of the rim 39b. The strip 61 may be wound upon itself to provide an adjustable connection 63 in a manner similar to Fig. 4.

Referring now to Fig. 7, there is shown a lagging member 37c similar to the lagging member 37 and having a rim 39c and a bridge 41c corresponding to the rim 39 and bridge 41 of the lagging member 37. As shown in Fig. 7, the bridge 41c includes an electroconductive bar 65 having one terminal engaging the side 43c of the rim 39c with the bar projecting from the side 43c toward the opposing side 45c of the rim. As shown in Fig. 7, the bar 65 substantially bridges the space between the sides 43c and 45c, but is spaced from the side 45c by a small distance. In order to provide an adjustable bridge, a deformable wire or strip 67 of electroconductive material is provided with one terminal thereof engaging the bar 65 and the other terminal thereof engaging the side 45c. The strip 67 may be provided with an adjustable connection 69 as described with reference to Figs. 4 and 5.

Referring now to Fig. 10, there is shown a lagging member 37d having a rim 39d and a bridge 41d corresponding to the rim 39 and the bridge 41 of the lagging member 37. Adjustment of the resistance of the bridge 41d is effected in a slightly different manner than the adjustment of the resistances of the bridges 41a, 41b and 41c described previously. In the specific embodiment shown in Fig. 10, the bridge 41d comprises a strip of electroconductive material disposed substantially in the form of a U and having one terminal 71 engaging a surface of the side 43d of the rim 39d and having the other terminal 73 engaging the opposite surface of the opposite side 45d. The strip includes a portion 75 of enlarged width disposed intermediate the terminals 71 and 73. In order to provide for adjustment of the resistance of the bridge 41d, the portion 75 of the strip has a plurality of openings 77 spaced along the width thereof and an opening 79 disposed centrally of the portion 73. The openings 77 and the opening 79 define a plurality of bridge portions providing parallel paths for current traversing the strip. Such bridge portions may be interrupted in any desired manner to effect the interruption of one or more of the parallel current paths. For example, by severing the bridge portions along the dotted lines 81 of Fig. 10, current traversing the parallel paths provided by the severed bridge portions is diverted to adjacent paths which are of increased length and which are of reduced cross section. Consequently, by severing the bridge portions defined by the several openings progressively from the center of the portion 75 to the peripheries thereof, the length of the paths is increased and the cross section thereof is reduced. Consequently, the resistance of the paths offered to current flowing in the strip becomes increasingly large. It will be observed with reference to Fig. 10 that the portion 75 of increased width is spaced a substantial distance from the plane of the magnetic structure 1 to permit severance of the various bridge portions. The bridge portions connecting the several openings may be severed in any desired manner, such as by a suitable metal cutting device. Insulation 83 is provided between the strip and the rim 39d adjacent the portion of increased width 73.

As mentioned previously, the lagging member may be located in any position relative to the magnetic structure 1 wherein it intercepts or surrounds the desired magnetic flux. In the specific embodiment of Fig. 1, the lagging member 37 is positioned to surround the current magnetic poles 7 and 9 adjacent the air gap 15. The lagging members 37a, 37b, 37c and 37d may be proportioned for positioning in a similar manner. With such construction, additional desirable performance characteristics of the watthour meter may be provided. For example, watthour meters are commonly provided with magnetic members proportioned and positioned to shunt current magnetic flux away from the associated air gap for controlling the load response of the meter. Such a shunt 85 is illustrated in Fig. 1 disposed intermediate the current poles 7 and 9 adjacent the air gap 15. With the lagging member 37 positioned as shown in Fig. 1, the bridge 41 is disposed between the current poles 7 and 9 slightly beneath the air gap 15. By proper selection of the dimensions and materials of the bridge 41, the bridge may be effective to shunt magnetic flux away from the air gap 15 and the disc 17 for the purpose of controlling the load response of the meter. The bridge 41 may be employed either alone or in combination with an additional magnetic member to provide the desired control. Materials and dimensions of the bridges 41a, 41b, 41c and 41d may be selected to render such bridges effective as shunting members.

For certain purposes, it may be desirable to position the lagging member relative to the magnetic structure 1 in the manner shown in Figs. 8 and 9. As there shown, a lagging member such as the lagging member 37d of Fig. 10 surrounds the voltage magnetic pole 3a adjacent the air gap 15. The voltage pole 3a is provided with a recess 87 proportioned to accommodate a portion of the bridge 41d. It is observed with reference to Fig. 9 that the pole face 5a of the voltage pole 3a is of reduced area by reason of the recess 87. For certain installations, such construction may impair the accuracy of the watthour meter. In order to improve the performance characteristics of the watthour meter, the lagging member may be positioned relative to the voltage pole 3a in a manner shown in Fig. 8. As there shown, the voltage pole 3b is provided with a recess 87a proportioned to accommodate the bridge 41d. However, the bridge 41d is substantially enclosed by means of the voltage pole 3a with the result that the area of the pole face 5b is substantially increased from the area thereof of Fig. 9.

In the specific embodiment of Fig. 10, a lagging member such as the member 37d is illustrated as being associated with the voltage magnetic pole of the watthour meter. However, lagging members such as the lagging members 37, 37a, 37b and 37c may also be positioned relative to the voltage pole of the watthour meter if desired.

Although the invention has been described with reference to certain specific embodiments thereof, numerous embodiments thereof are possible, and it is desired to cover all embodiments falling within the spirit and scope of the invention.

I claim as my invention:

1. In an alternating-current device, a magnetic structure having an air gap, said magnetic structure including a first magnetic pole piece having a pole face adjacent the air gap and a pair of spaced second pole pieces having pole faces adjacent the air gap, an electroconductive armature, means mounting the armature for rotation relative to the pole pieces through the air gap, first winding means surrounding said first pole piece effective when energized for producing a first alternating magnetic flux, second winding means surrounding said second pole pieces effective when energized for producing a second alternating magnetic flux cooperating with the first alternating magnetic flux to establish a shifting magnetic field in the air gap for influencing said armature, means for controlling the phase relationship between the magnetic fluxes, said last-named means comprising a lagging member including an electroconductive rim and an electroconductive bridge connecting spaced points of said rim to provide a pair of openings establishing a figure-of-eight configuration, and means securing the lagging member to said second pole pieces with each of said second pole pieces projecting into a separate opening, said bridge being positioned intermediate said second pole pieces beneath said air gap and being constructed of a magnetic material.

2. In an alternating-current watthour meter, a magnetic structure comprising a voltage magnetic pole having a first pole face, and a pair of spaced current magnetic poles having second pole faces disposed in a common plane spaced from the first pole face to define an air gap, an electroconductive armature positioned in the air gap, means mounting the armature for rotation relative to the magnetic structure, a voltage winding associated with the voltage magnetic pole, said voltage winding being effective when energized by an alternating voltage for producing alternating voltage magnetic flux, current windings associated with the current magnetic poles, said current windings being effective when energized by an alternating current for producing alternating current magnetic flux cooperating with the voltage magnetic flux to establish a shifting magnetic field in the air gap for influencing said armature, an electroconductive member positioned in the path of said voltage magnetic flux, said member being adjustable relative to said voltage magnetic flux for controlling the light load response of the meter, means for controlling the phase relationship of said alternating magnetic fluxes, said means comprising a lagging member including an electroconductive rim and an electroconductive bridge connecting spaced points of said rim to define a pair of openings, and means securing said lagging member to said current poles with each of said current poles projecting into a separate opening, said bridge being positioned asymmetrically of the path of said voltage magnetic flux for providing an additional control of the light load response of the meter.

3. An alternating current device comprising means effective when energized for producing first and second alternating magnetic fluxes, and a lagging member for the magnetic fluxes, said lagging member including an electroconductive rim for lagging said first magnetic flux and an electroconductive bridge connecting spaced points of said rim for lagging said second magnetic flux, said bridge including first and second portions, one terminal of each portion engaging a separate side of said rim and the other terminals of said portions being in engagement, said first portion substantially bridging the space between said opposing sides and being constructed of a magnetic material, the length of said second portion being adjustable for varying the electrical resistance of said bridge.

4. An alternating current device comprising means effective when energized for producing first and second alternating magnetic fluxes, and a lagging member for the magnetic fluxes, said lagging member including an electroconductive closed loop for lagging said first magnetic flux and an electroconductive bridge connecting spaced points of said loop for lagging said second magnetic flux, said bridge including an electroconductive strip having a plurality of openings spaced along an axis extending substantially transverse to the direction of extension of the strip to define a plurality of parallel paths for current traversing said strip, portions of the strip connecting said openings being severable for varying the electrical resistance of said strip.

5. In an alternating-current watthour meter, a magnetic structure comprising a voltage magnetic pole and a pair of spaced current magnetic poles, an electroconductive armature, means mounting the armature for rotation relative to the magnetic structure, a voltage winding associated with the voltage magnetic pole, said voltage winding being effective when energized by an alternating voltage for producing alternating voltage magnetic flux, current windings associated with the current magnetic poles, said current windings being effective when energized by an alternating current for producing alternating current magnetic flux cooperating with the voltage magnetic flux to establish a shifting magnetic field influencing said armature, a lagging member including an electroconductive rim for lagging said voltage magnetic flux and an electroconductive bridge connecting spaced points of said rim for lagging said current magnetic flux, said bridge defining a pair of openings establishing a figure-of-eight configuration of said lagging member, and means securing the lagging member to said current magnetic poles with each of said poles projecting into a separate one of said openings.

6. In an alterating-current watthour meter, a magnetic structure comprising a voltage magnetic pole having a first pole face, and a pair of spaced current magnetic poles having second pole faces disposed in a common plane spaced from the first pole face to define an air gap, an electroconductive armature positioned in the air gap, means mounting the armature for rotation relative to the magnetic structure through the air gap, a voltage winding associated with the voltage magnetic pole, said voltage winding being effective when energized by an alternating voltage for producing alternating voltage magnetic flux, current windings associated with the current magnetic poles, said current windings being effective when energized by an alternating current for producing alternating current magnetic flux cooperating with the voltage magnetic flux to establish a shifting magnetic field in the air gap for influencing said armature, a lagging member including an electroconductive closed loop and an electroconductive bridge connecting spaced points of said rim to define a pair of openings establishing a figure-of-eight configuration, and means securing the lagging member to said magnetic structure in a position wherein current magnetic flux is directed in opposite directions through said respective openings and wherein voltage magnetic flux is directed substantially in the same direction and magnitude on each side of the bridge through said openings, said bridge comprising an electroconductive strip including a portion of enlarged width, said portion having a plurality of openings defining a plurality of paths for current traversing said strip, portions of the strip connecting said openings being severable for varying the electrical resistance of said strip.

7. In an alternating-current watthour meter, a magnetic structure comprising a voltage magnetic pole having a first pole face, and a pair of spaced current magnetic poles having second pole faces disposed in a common plane spaced from the first pole face to define an air gap, an electroconductive armature positioned in the air gap, means mounting the armature for rotation relative to the magnetic structure through the air gap, a voltage winding associated with the voltage magnetic pole, said voltage winding being effective when energized by an alternating voltage for producing alternating voltage magnetic flux, current windings associated with the current magnetic poles, said current windings being effective when energized by an alternating current for producing alternating current magnetic flux cooperating with the voltage magnetic flux to establish a shifting magnetic field in the air gap for influencing said armature, a lagging member including an electroconductive rim and an electroconductive bridge connecting spaced points of said rim, said first pole face having a recess proportioned to receive said bridge, and means securing said lagging member to said voltage magnetic pole with said bridge positioned in said recess.

8. In an alternating-current watthour meter, a magnetic structure comprising a voltage magnetic pole having a first pole face and a pair of spaced current magnetic poles having second pole faces, said second pole faces being disposed in a common plane spaced from the first pole face to define an air gap, an electroconductive armature positioned in the air gap, means mounting the armature for rotation relative to the magnetic structure through the air gap, a voltage winding associated with the voltage magnetic pole, said voltage winding being effective when energized by an alternating voltage for producing alternating voltage magnetic flux, current windings associated with the current magnetic poles, said current windings being effective when energized by an alternating current for producing alternating-current magnetic flux cooperating with the voltage magnetic flux to establish a shifting magnetic field in the air gap for influencing the armature, a lagging member including an electroconductive closed loop and a strip formed of an electroconductive magnetic material extending between and connecting spaced points of the loop to define a pair of openings establishing a figure-of-eight configuration of the lagging member, said strip having a plurality of openings spaced along an axis extending substantially transverse to the direction of extension of the strip to define a plurality of parallel paths for current traversing the strip, portions of the strip connecting the openings being severable for varying the electrical resistance of the strip, and means securing the lagging member to the magnetic structure to direct voltage magnetic flux in substantially the same direction and magnitude through the loop on each side of the strip, and to direct current magnetic flux through the loop in opposite directions but in the same magnitude on each side of the strip.

9. An alternating-current instrument comprising flux means effective when energized for producing first and second alternating magnetic fluxes in combination with a device for controlling the phase relationship of said magnetic fluxes, said device comprising an electroconductive closed main loop member having an electroconductive bridge extending across said loop member to establish with the main loop member first and second sub loops, said flux means comprising means for linking a separate component of said first magnetic flux with each of the sub loops for inducing substantially equal voltages acting in the same direction relative to the main loop member to produce a flow of a first current in the main loop member which does not flow through the bridge, said flux means also comprising means for linking with each of the sub loops a component of the second magnetic flux for inducing a voltage in the bridge member which directs a second current through said bridge which divides to provide substantially equal components through the sub loops, said flux means including a pair of polar magnetic extensions each passing through a separate one of said sub loops, said polar extensions having pole faces disposed in a common plane, and magnetic means spaced from said plane to define with the pole faces an air gap which is clear of the device.

10. In an alternating-current device, a magnetic structure having an air gap, said magnetic structure including a first magnetic pole piece having a pole face adjacent the air gap and a pair of spaced second pole pieces having pole faces adjacent the air gap, an electroconductive armature, means mounting the armature for rotation relative to the pole pieces through the air gap, first winding means surrounding said first pole piece effective when energized for producing a first alternating magnetic flux, second winding means surrounding said second pole pieces effective when energized for producing a second alternating magnetic flux cooperating with the first alternating magnetic flux to establish a shifting magnetic field in the air gap for influencing said armature, means for controlling the phase relationship between the magnetic fluxes, said last-named means comprising a lagging member including an electroconductive rim and an electroconductive bridge connecting spaced points of said rim to provide a pair of openings establishing a figure-of-eight configuration, and means securing the lagging member to said second pole pieces with each of said second pole pieces projecting into a separate opening, said bridge being positioned intermediate said second pole pieces beneath said air gap and being constructed of a magnetic material, said rim and said bridge being formed of materials having different temperature coefficients of impedance.

11. In an alternating-current watthour meter, a magnetic structure comprising a voltage magnetic pole having a first pole face, and a pair of spaced current magnetic poles having second pole faces disposed in a common plane spaced from the first pole face to define an air gap, an electroconductive armature positioned in the air gap, means mounting the armature for rotation relative to the magnetic structure, a voltage winding associated with the voltage magnetic pole, said voltage winding being effective when energized by an alternating voltage for producing alternating voltage magnetic flux, current windings associated with the current magnetic poles, said current windings being effective when energized by an alternating current for producing alternating current magnetic flux cooperating with the voltage magnetic flux to establish a shifting magnetic field in the air gap for influencing said armature, an electroconductive member positioned in the path of said voltage magnetic flux, said member being adjustable relative to said voltage magnetic flux for controlling the light load response of the meter, means for controlling the phase relationship of said alternating magnetic fluxes, said means comprising a lagging member including an electroconductive rim and an electroconductive bridge connecting spaced points of said rim to define a pair of openings, and means securing said lagging member to said current poles with each of said current poles projecting into a separate opening, said bridge being positioned asymmetrically of the path of said voltage magnetic flux for providing an additional control of the light load response of the meter, said bridge being constructed of magnetic material and being positioned intermediate said current poles beneath said air gap.

12. In an alternating-current watthour meter, a magnetic structure comprising a voltage magnetic pole having a first pole face, and a pair of spaced current magnetic poles having second pole faces disposed in a common plane spaced from the first pole face to define an air gap, an electroconductive armature positioned in the air gap, means mounting the armature for rotation relative to the magnetic structure, a voltage winding associated with the voltage magnetic pole, said voltage winding being effective when energized by an alternating voltage for producing alternating voltage magnetic flux, current windings associated with the current magnetic poles, said current windings being effective when energized by an alternating current for producing alternating current magnetic flux cooperating with the voltage magnetic flux to establish a shifting magnetic field in the air gap for influencing said armature, an electroconductive member positioned in the path of said voltage magnetic flux, said member being adjustable relative to said voltage magnetic flux for controlling the light load response of the meter, means for controlling the phase relationship of said alternating magnetic fluxes, said means comprising a lagging member including an electroconductive rim and an electroconductive bridge connecting spaced points of said rim to define a pair of openings, and means securing said lagging member to said current poles with each of said current poles projecting into a separate opening, said bridge being positioned asymmetrically of the path of said voltage magnetic flux for providing an additional control of the light load response of the meter, said bridge being formed of material having a greater temperature coefficient of impedance than the material of said rim.

13. An alternating-current device comprising means effective when energized for producing first and second alternating magnetic fluxes, and a lagging member for the magnetic fluxes, said lagging member including an electroconductive rim for lagging said first magnetic flux and an electroconductive bridge connecting spaced points of said rim for lagging said second magnetic flux, said bridge including first and second portions, one terminal of each portion engaging a separate side of said rim and the other terminals of said portions being in engagement, said first portion substantially bridging the space between said opposing sides and being constructed of a magnetic material, the length of said second portion being adjustable for varying the electrical resistance of said bridge, said bridge and said rim having different temperature coefficients of impedance.

14. An alternating-current device comprising means effective when energized for producing first and second alternating magnetic fluxes, and a lagging member for the magnetic fluxes, said lagging member including an electroconductive closed loop for lagging said first magnetic flux and an electroconductive bridge connecting spaced points of said loop for lagging said second magnetic flux, said bridge including an electroconductive strip having a plurality of openings spaced along an axis extending substantially transverse to the direction of extension of the strip to define a plurality of parallel paths for current traversing said strip, portions of the strip connecting said openings being severable for varying the electrical resistance of said strip, said loop and said bridge being formed of materials having different temperature coefficients of impedance.

15. In an alternating-current watthour meter, a magnetic structure comprising a voltage magnetic pole having a first pole face and a pair of spaced current magnetic poles having second pole faces, said second pole faces being disposed in a common plane spaced from the first pole face to define an air gap, an electroconductive armature positioned in the air gap, means mounting the armature for rotation relative to the magnetic structure through the air gap, a voltage winding associated with the voltage magnetic pole, said voltage winding being effective when energized by an alternating voltage for producing alternating voltage magnetic flux, current windings associated with the current magnetic poles, said current windings being effective when energized by an alternating current for producing alternating-current magnetic flux cooperating with the voltage magnetic flux to establish a shifting magnetic field in the air gap for influencing the armature, a lagging member including an electroconductive closed loop and a strip formed of an electroconductive magnetic material extending between and connecting spaced points of the loop to define a pair of openings establishing a figure-of-eight configuration of the lagging member, said strip having a plurality of openings spaced along an axis extending substantially transverse to the direction of extension of the strip to define a plurality of parallel paths for current traversing the strip, portions of the strip connecting the openings being severable for varying the electrical resistance of the strip, and means securing the lagging member to the magnetic structure to direct voltage magnetic flux in substantially the same direction and magnitude through the loop on each side of the strip, and to direct current magnetic flux through the loop in opposite directions but in the same magnitude on each side of the strip, said loop and said strip being formed of materials having different temperature coefficients of impedance.

16. In an alternating-current device, a magnetic structure comprising a voltage magnetic pole having a voltage pole face and a pair of spaced current magnetic poles having current pole faces, said current pole faces being positioned in a common plane spaced from and parallel to the plane of the voltage pole face to define an air gap, an electroconductive armature positioned in the air gap, voltage winding means surrounding the voltage magnetic pole effective when energized for producing an alternating voltage magnetic flux, said voltage flux having components which traverse said current poles in parallel relation, current winding means surrounding the current magnetic poles effective when energized for producing an alternating-current magnetic flux cooperating with the voltage magnetic flux to establish a shifting magnetic field in the air gap, means mounting the armature for rotation relative to the magnetic structure through the air gap under the influence of the magnetic field, and means for controlling the phase relationship between the magnetic fluxes, said means comprising an electroconductive lagging member including a closed loop surrounding said current magnetic poles clear of said air gap and clear of the space between said current poles, said loop directing currents produced therein by said voltage flux components in the same direction about said current poles to effect lagging of said voltage flux.

References Cited in the file of this patent

UNITED STATES PATENTS

| | | |
|---|---|---|
| 1,856,554 | Harris | May 3, 1932 |
| 2,146,606 | Trekell | Feb. 7, 1939 |
| 2,336,834 | Bakke | Dec. 14, 1943 |
| 2,512,345 | Leippe | June 20, 1950 |